US012792300B2

(12) United States Patent
Suttorp

(10) Patent No.: US 12,792,300 B2
(45) Date of Patent: Nov. 10, 2026

(54) METHOD AND SYSTEM FOR TRANSMITTING DIGITAL SIGNALS

(71) Applicant: EverProX Technologies Munich GmbH, Munich (DE)

(72) Inventor: Thomas Suttorp, Munich (DE)

(73) Assignee: EverProX Technologies Munich GmbH, Munich (DE)

( * ) Notice: Subject to any disclaimer, the term of this patent is extended or adjusted under 35 U.S.C. 154(b) by 0 days.

(21) Appl. No.: 19/198,854

(22) Filed: May 5, 2025

(65) Prior Publication Data

US 2025/0348274 A1 Nov. 13, 2025

Related U.S. Application Data

(60) Provisional application No. 63/645,057, filed on May 9, 2024.

(51) Int. Cl.
*G06F 5/06* (2006.01)

(52) U.S. Cl.
CPC .................................... *G06F 5/06* (2013.01)

(58) Field of Classification Search
CPC ........................................................ G06F 5/06
USPC ........................................................... 710/52
See application file for complete search history.

(56) References Cited

U.S. PATENT DOCUMENTS 1,080,490 A * 12/1913 Silveira .................... B63G 1/00 89/36.13
5,808,571 A * 9/1998 Kuwata ................. H04J 3/0685 341/100
7,369,069 B2 * 5/2008 Usugi ...................... H03M 9/00 341/100
2004/0066869 A1 * 4/2004 Takiue .................... H04J 3/062 375/354
2006/0050827 A1 * 3/2006 Saeki ...................... H03M 9/00 375/362
2009/0195272 A1 * 8/2009 Okuzono ............. H03L 7/0812 327/141
2011/0028959 A1 * 2/2011 Chasan .................. A61B 18/12 606/49
2011/0122002 A1 * 5/2011 Tsunoda .................. H03M 9/00 331/34
2011/0193602 A1 * 8/2011 Adachi ................. H03L 7/0991 327/158
2016/0072522 A1 * 3/2016 Ichikura .................. H04L 7/044 341/100

(Continued)

FOREIGN PATENT DOCUMENTS

CN 120934537 A * 11/2025 ............... G06F 5/06

*Primary Examiner* — Christopher B Shin
(74) *Attorney, Agent, or Firm* — Kilpatrick Townsend & Stockton LLP

(57) ABSTRACT

The present invention relates to digital signal transmission systems and methods for serializing data produced by two or more independent data sources into a single bitstream with enhanced robustness against skew, jitter, phase drifts, and alignment errors. The system includes a first circuit, a second circuit, and a serialization module. The first circuit includes a first parallel conversion circuit and a first synchronization circuit coupled to the first parallel conversion circuit. The second circuit includes a second parallel conversion circuit, a second latch coupled to the second parallel conversion circuit, and a second synchronization circuit coupled to the second latch.

20 Claims, 6 Drawing Sheets

(56) References Cited

U.S. PATENT DOCUMENTS

| | | | | |
|---|---|---|---|---|
| 2017/0003344 | A1* | 1/2017 | Uekusa | G01R 31/31723 |
| 2021/0234553 | A1* | 7/2021 | Miura | H04L 25/02 |
| 2021/0313993 | A1* | 10/2021 | Bai | H04L 7/005 |
| 2023/0026148 | A1* | 1/2023 | Livneh | H04L 7/0008 |
| 2024/0371430 | A1* | 11/2024 | Kwak | H03K 3/037 |
| 2025/0348274 | A1* | 11/2025 | Suttorp | G06F 5/06 |

* cited by examiner

METHOD AND SYSTEM FOR TRANSMITTING DIGITAL SIGNALS

CROSS-REFERENCES TO RELATED APPLICATIONS

This application claims priority to U.S. Provisional Patent Application No. 63/645,057, filed on May 9, 2024, and entitled "METHOD AND SYSTEM FOR TRANSMITTING DIGITAL SIGNALS," the disclosure of which is hereby incorporated by reference in its entirety.

BACKGROUND OF THE INVENTION

Serialization of data from two data sources has been performed in different applications, including data communications applications. As an example, data from two data sources can be multiplexed using time division multiplexing in order to output a serialized data stream.

Despite the progress made in these serialization technologies, there is a need in the art for improved methods and systems related to serialization of data.

SUMMARY OF THE INVENTION

The present invention relates generally to digital signal transmission technologies, more specifically to methods and systems for serializing data produced by two or more independent data sources into a single bitstream with enhanced robustness against skew, jitter, phase drifts, and alignment errors. Merely by way of example, embodiments of the present invention serialize data from two different data sources (e.g., D-PHY video data bit streams) into one serial bit stream. The mobile industry processor interface (MIPI) standard defines three physical (PHY) layer specifications: MIPI D-PHY, M-PHY, and C-PHY. The MIPI D-PHY and C-PHY physical layers support camera and display applications. The "D" in D-PHY is derived from the Roman numeral for 500, reflecting that, historically, D-PHY communicated at 500 Mbps.

A system of one or more computers can be configured to perform particular operations or actions by virtue of having software, firmware, hardware, or a combination of them installed on the system that in operation causes or cause the system to perform the actions.

One general aspect includes a data processing circuit. The data processing circuit includes a first circuit and a second circuit. The first circuit includes a first parallel conversion circuit and a first synchronization circuit coupled to the first parallel conversion circuit. The first parallel conversion circuit may include a first serial-to-parallel distributor, a first clock divider characterized by a division ratio m, and a first d-type flip flop (D-FF). The second circuit may include a second parallel conversion circuit, a second latch coupled to the second parallel conversion circuit, and a second synchronization circuit coupled to the second latch. The second parallel conversion circuit includes a second serial-to-parallel distributor, a second clock divider characterized by the division ratio m, and a second D-FF. The circuit may also include a serialization module coupled to the first synchronization circuit and the second synchronization circuit.

Implementations may include one or more of the following features. The data processing circuit where the first circuit may further include a first latch coupled to the first parallel conversion circuit and the first clock divider, and the first synchronization circuit is coupled to the first latch. The first serial-to-parallel distributor and the first clock divider are coupled to a first source, and the first D-FF is coupled to the first serial-to-parallel distributor and the first clock divider. The first serial-to-parallel distributor or the second serial-to-parallel distributor may include an n-bit shift register.

One general aspect includes a method of serializing data. The method of serializing data also includes receiving a first serial data (D1*a*) and a first clock signal (CK1) from a first source. The data also includes receiving a second serial data (D2*a*) and a second clock signal (CK2) from a second source, parallelizing the first serial data to produce a first parallel signal (D1*c*), parallelizing the second serial data to produce a second parallel signal (D2*c*), latching the first parallel signal, using a first enable signal (ENN1) to produce a first latched signal (D1*d*). The method also includes latching the second parallel signal, using a second enable signal (ENN2), to produce a second latched signal (D2*d*). The method may also include synchronizing the first latched signal with the second latched signal to produce a first synchronized signal (D1*e*) and a second synchronized signal (D2*e*). The method may also include serializing the first synchronized signal and the second synchronized signal to produce a serial bitstream.

Implementations may include one or more of the following features. Parallelizing the first serial data include: sampling the first serial data by the first clock signal and deserializing the first serial data into a first packet of n-bits signal; and synchronizing the first packet of n-bits signal to a first divided clock signal, wherein the first divided clock signal is derived from the first clock signal by a first clock divider. Parallelizing the second serial data may include: sampling the second serial data by the second clock signal and deserializing the second serial data into a second n-bits signal; and synchronizing the second n-bits signal to a second divided clock signal, wherein the second divided clock signal is derived from the second clock signal by a second clock divider. The first serial data may include at least two data lanes of serial data, and the second serial data may include at least two data lanes of serial data. Parallelizing may include parallelizing the first serial data and the second serial data; latching may include latching each data lane of the second parallel signal; synchronizing may include synchronizing each data lane of the first parallel signal and synchronizing each data lane of the second latched signal; and serializing may include serializing each data lane of the first synchronized signal and each data lane of the second synchronized signal to produce the serial bitstream. The serial bitstream includes the first synchronized signal, the second synchronized signal, and the one or more additional signals.

BRIEF DESCRIPTION OF THE DRAWINGS

The present disclosure is described in conjunction with the appended figures.

Figure 1:
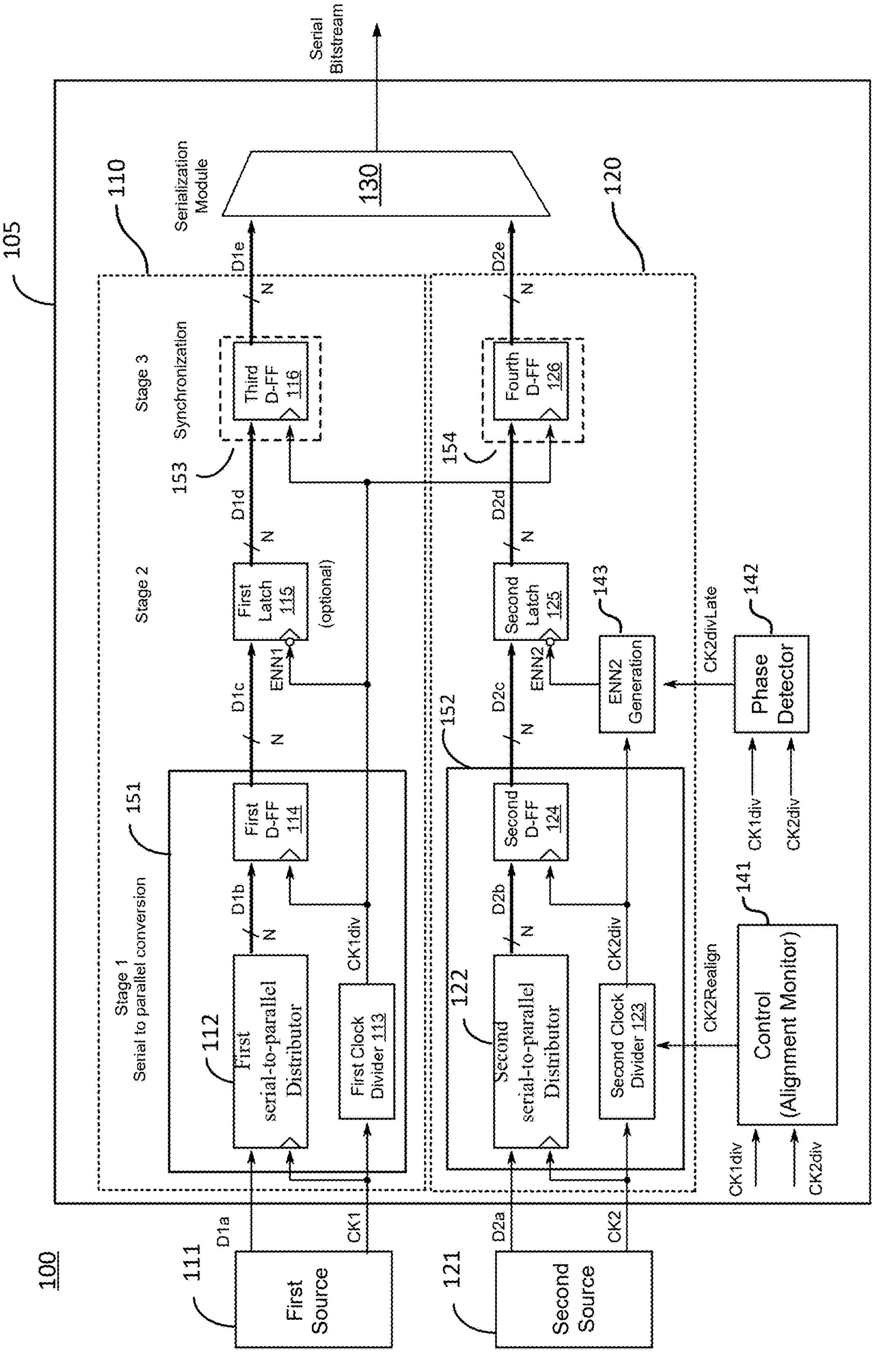
FIG. 1 illustrates a system for serializing data produced using two independent clock and data sources into a single bitstream according to an embodiment of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF SPECIFIC EMBODIMENTS

The ensuing description provides preferred exemplary embodiment(s) only, and is not intended to limit the scope, applicability, or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

In digital systems, for example, digital video systems, especially those requiring high bandwidth and reliability such as high-definition video streaming or video conferencing, data is often transmitted over multiple lanes or channels. However, transmitting video data across separate lanes introduces challenges, particularly necessitating a multi-interconnection framework instead of a more efficient single-interconnection system. Aggregator FPGA may be used to decode and evaluate the video data to perform aggregation to enforce two inputs to one output video aggregator bridge. However, this solution is complex and leads to significant increases in area, power consumption, and cost.

In the context of serialized data transmission from dual or more independent sources, the conventional strategy involves the separate serialization of data from each source. This conventional approach, however, necessitates a multi-interconnection framework as opposed to a more efficient single-interconnection system. Such a requirement not only escalates the spatial allocation within the system architecture but also significantly elevates the associated costs. This cost increment is particularly pronounced in scenarios involving optical interconnections, where the necessity for additional components, including but not limited to extra lasers, photodiodes, and optical fibers, becomes inevitable.

An alternative solution could involve utilizing a specialized aggregator FPGA, explicitly designed for dual-camera configurations, that decodes and evaluates the video data to perform aggregation. However, this system is overly complex and leads to significant increases in area, power consumption, and cost. For example, for dual-camera setups, such as those used in stereo or 3D applications, with equal bit rates (identical video resolution), this approach may not be the most efficient. The complexity and resource demands of managing two independent video streams through such an aggregator can outweigh the benefits, particularly when the application requires synchronization and alignment of video frames with minimal latency. As a result, while the aggregator FPGA provides a technically feasible solution for integrating multiple video sources, its practical application might be limited to scenarios where the increased complexity and resource requirements can be justified by the need for advanced processing or integration capabilities that simpler systems cannot offer.

Embodiments of the present invention seek to address the aforementioned challenges by providing a novel system and method for serializing two or more digital streams that can dynamically compensate for arbitrary skew, large jitters, and phase drifts, as well as misalignment issues, thereby ensuring high-quality serialization of two or more digital streams even under varying environmental conditions while providing a system at limited cost.

FIG. 1 illustrates a system for serializing data produced using two independent clock and data sources into a single bitstream according to an embodiment of the present invention. As illustrated in FIG. 1, the system 100 includes a data processing circuit 105, a first source 111, and a second source 121. The data processing circuit 105 includes a first circuit 110 that connects the first source 111 to a serialization module 130, and a second circuit 120 that connects the second source 121 to the serialization module 130. The serialization module 130 may be a multiplexer, a shift register, a digital signal processor (DSP), an application specific integrated circuit (ASIC), or the like.

The first source 111 and the second source 121 can be various sources of data, including image sensors, cameras, microphones, or the like. Each of the first source 111 and the second source 121 produces an independent bit stream, for example, two streams of video data, and the independent bit streams are combined to form a single serial bitstream. The serial bitstream can then be communicated using a serial link, for example, an optical fiber, an electrical conductor such as copper wire, or the like to another electronic or optoelectronic system.

In some embodiments, first source 111 and second source 121 are operated at a same bit rate. As an example, two cameras utilized in a 3D stereo camera system, e.g., a 3D visible camera system, can be operated at a common bit rate to produce stereo video data. Although first source 111 and second source 121 can be operated at the same bit rate, these sources can be characterized by skew, jitter, and the like. In some embodiments, the first source 111 and second source 121 utilize two separate chips and each chip has its own internal Phase-Locked Loop (PLL), which is relatively slow and roughly multiplies an incoming reference frequency to achieve a higher frequency in the output data stream. In addition, the first source 111 and second source 121 may have been activated by commands at different times. Thus, although they generally operate at the same average frequency, their alignment can vary significantly, particularly during the startup phase. Furthermore, the phase relationship to the incoming clock may remain consistent, but variations can still occur during operation due to the two cameras not receiving exactly identical copies of the picture. The first source 111 may originate from a camera on the left side and the second source 121 may come from another camera on the right side, resulting in one camera receiving more light while the other camera receives less light, resulting in signal difference. These differences can translate into voltage changes, which then influence the feedback mechanism. It has been observed that these variations can lead to shifts of several unit intervals in the high-speed data stream. Therefore, although the long-term average frequencies of the cameras might be the same, there can be short-term fluctuations, with data streams moving a few bits forward or backward within a second or so. This can lead to shifts of a few bits in the bit stream before returning to the original alignment.

The first circuit 110 is configured to connect the first source 111 to the serialization module 130. The first circuit 110 is configured to receive a first serial data D1*a* and a first clock signal CK1 from the first source 111 and to produce a first synchronized signal D1*e* to the serialization module 130. Although the first serial data D1*a* is illustrated as a single data lane, it will be apparent to one of skill in the art that the first serial data D1*a* represents multiple data lanes, for instance, four data lanes or six data lanes. In an embodiment utilizing four data lanes produced by the first source 111, first serial data D1*a* would represent four data lanes output by the first source 111 along with the first clock signal CK1. As will be evident to one of skill in the art, the number of first serial-to-parallel distributors 112 and the number of first D-type Flip-Flop (D-FF) 114 will correspond to the number of data lanes produced by the first source 111.

The first circuit 110 comprises a first parallel conversion circuit 151, which can also be referred to as a Stage 1 serial-to-parallel conversion circuit, that is operable to convert the serial data produced by the first source 111 into parallel data, and a first synchronization circuit 153, which can also be referred to as a Stage 3 synchronization circuit, both of which will be described more fully below.

The first parallel conversion circuit 151 includes a first serial-to-parallel distributor 112, a first clock divider 113, and a first D-FF 114. The first serial-to-parallel distributor 112 may be an N-bit Shift Register, a demultiplexer, etc. The first clock divider 113 has a division ratio of M1. The first serial-to-parallel distributor 112 is configured to receive the first serial data D1*a* and the first clock signal CK1 and to output a first N-bits signal D1*b*, where N is a positive integer. The first clock divider 113 is configured to receive the first clock signal CK1 and to output a first divided clock signal CK1div. The first D-FF 114 is configured to receive the first N-bits signal D1*b* and the first divided clock signal CK1div and to output a first parallel signal D1*c*. The first clock divider's division ratio M1 may be the same as or different from the size N of the first serial-to-parallel distributor 112. As discussed above, although a first serial-to-parallel distributor 112 and first D-FF 114 are illustrated in FIG. 1, the number of first serial-to-parallel distributors 112 and the number of first D-FF 114 will correspond to the number of data lanes produced by the first source 111. Thus, the first parallel signal D1*c* at the output of first parallel conversion circuit 151 represents the conversion of the one bit signal (i.e., the first serial data D1*a* at a predetermined bit rate) into an N-bit, parallel signal characterized by a lower bit rate than the predetermined bit rate. Thus, as described more fully below, embodiments enable the alignment of first latched signal D1*d* and second latched signal D2*d* at lower speeds than the rate corresponding to the initial serial data streams, thereby reducing system requirements.

The first synchronization circuit 153 comprises a third D-FF 116. The third D-FF 116 is configured to receive the first parallel signal D1*c* and the first divided clock signal CK1div and to output the first synchronized signal D1*e* to the serialization module 130.

The first circuit 110 also includes a first latch 115 connected between the first parallel conversion circuit 151 and the first synchronization circuit 153. The first latch 115 is optional in some embodiments. When the first latch 115 is utilized, the first latch 115 is configured to receive the first parallel signal D1*c* and a first enable signal ENN1. The first synchronization circuit 153 is configured to receive the first latched signal D1*d* and the first divided clock signal CK1div and to output a first synchronized signal D1*e* to the serialization module 130. The first enable signal ENN1 may be the first divided clock signal CK1div.

The second circuit 120 is configured to connect a second source 121 to the serialization module 130. The second circuit 120 is configured to receive a second serial data D2*a* and a second clock signal CK2 from the second source 121, and to output a second synchronized signal D2*e* to the serialization module 130. The second circuit 120 includes a second parallel conversion circuit 152, a second latch 125, and a second synchronization circuit 154.

The second parallel conversion circuit 152 comprises a second serial-to-parallel distributor 122, a second clock divider 123, and a second D-FF 124. The second clock divider 123 has a division ratio of M2, wherein M2 is a positive integer. The second serial-to-parallel distributor 122 comprises one of an N-bit Shift Register, a demultiplexer, or the like. The second serial-to-parallel distributor 122 is configured to receive the second serial data D2*a* and the second clock signal CK2 and to output a second N-bits signal D2*b*. The second clock divider 123 is configured to receive the second clock signal CK2 and to output a second divided clock signal CK2div. The second D-FF 124 is configured to receive the second N-bits signal D2*b* and the second divided clock signal CK2div and to output a second parallel signal D2*c* to the second latch. The second latch 125 is configured to receive the second parallel signal D2*c* and a second enable signal ENN2 and to output a second latched signal D2*d*. The second latch 125 introduces a delay or passes the data (in a transparent mode of operation) as described more fully herein. The second latch 125 can delay the second parallel signal D2*c* in order to provide the second latched signal D2*d* in a delayed manner that enables alignment (i.e., temporal alignment) of first parallel signal D1*c* or first latched signal D1*d* with second latched signal D2*d*. In other cases, the second latch 125 passes the second parallel signal D2*c* without delay to provide the second latched signal D2*d*. The division ratio M2 of the second clock divider 123 may be the same as or different from the size N of the second serial-to-parallel distributor 122. The division ratio M2 of the second clock divider 123 may be the same with the division ratio M1 of the first clock divider 113.

The second synchronization circuit 154 comprises a fourth digital flip flop (D-FF) 126. The fourth D-FF 126 is configured to receive the second latched signal D2*d* and the first divided clock signal CK2div and to output a first synchronized signal D2*e* to serialization module 130.

The serialization module 130 is configured to receive the first synchronized signal D1*e* and second synchronized signal D2*e* and to output a serial bitstream. The serialization module 130 may be any multiplexer/serializer circuit.

Figures 2A, 2B:
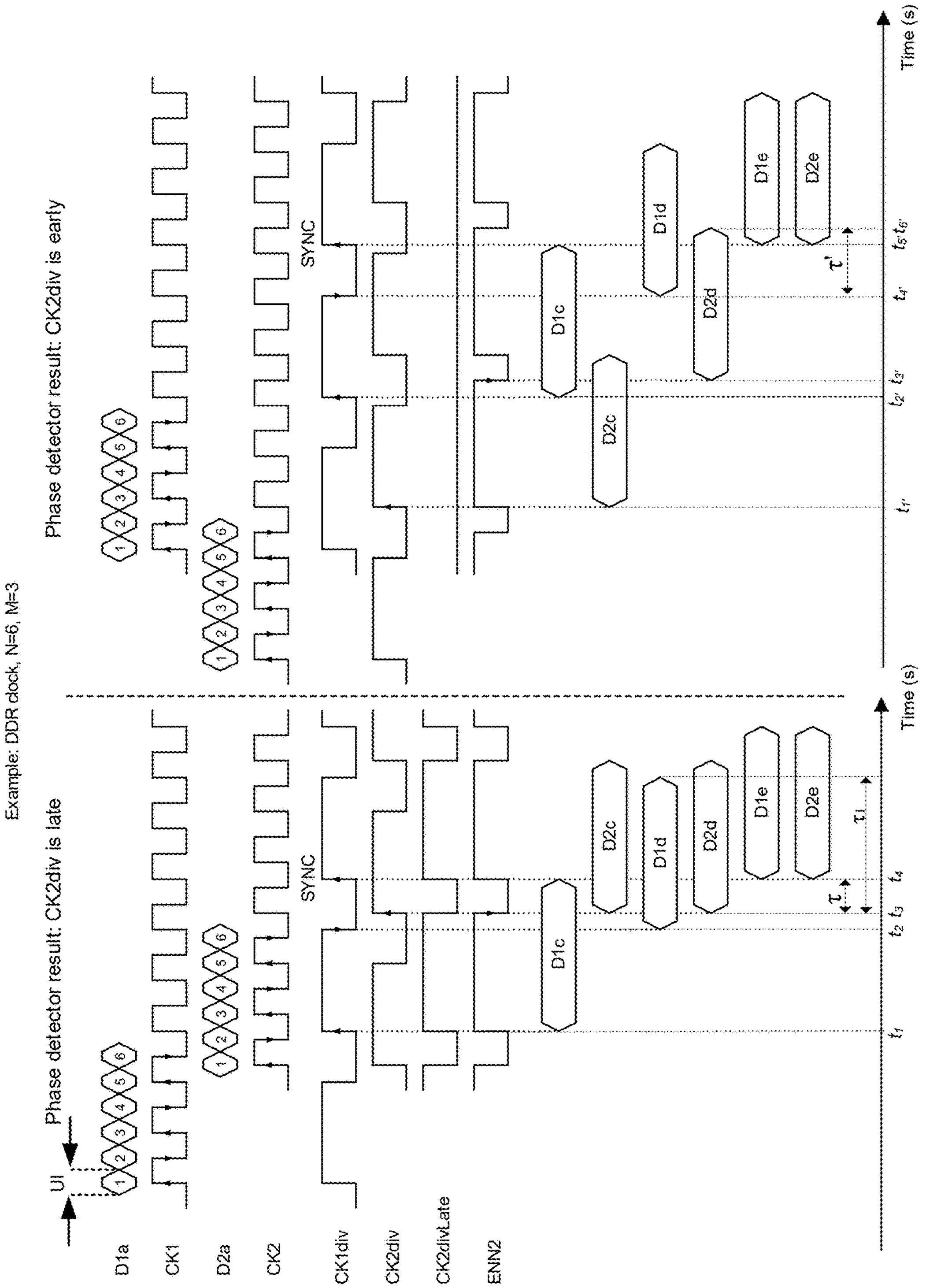
FIG. 2A illustrates waveforms corresponding to a second divided clock signal being late compared to a first divided clock signal according to an embodiment of the present invention.
FIG. 2B illustrates waveforms corresponding to the second divided clock signal being early compared to the first divided clock signal according to an embodiment of the present invention.

The data processing circuit 105 may further include an alignment monitor 141. The alignment monitor 141 is configured to monitor the first divided clock signal CK1div and the second divided clock signal CK2div, to identify the phase difference between the first divided clock signal CK1div and the second divided clock signal CK2div, and then to control the second divided clock signal CK2div to align the second divided clock signal CK2div with the first divided clock signal CK1div. This alignment monitor 141 is used to monitor the skew between first divided clock signal CK1div and second divided clock signal CK2div and can trigger a (re-)alignment of the second clock divider 123 by synchronizing the state of the second clock divider 123 to the state of the first clock divider 113. This may be done at least once, (e.g., during startup) to start with a desired (e.g., the optimal) position and to offer the largest jitter tolerance. Referring to FIG. 2A, once the first divided clock signal CK1div and the second divided clock signal CK2div are aligned, the rising edges of these divided clock signals will occur at the same time.

The data processing circuit 105 also includes a phase detector 142 and an enable generator 143. The phase detector 142 is configured to identify a phase difference between first divided clock signal CK1div and second divided clock signal CK2div. The enable generator 143 is configured to receive the second divided clock signal CK2div and the phase difference CK2divLate from the phase detector 142 and to output the second enable signal ENN2 to the second latch 125.

In an embodiment where the system comprises both the first latch 115 and the second latch 125, the first latch 115 and the second latch 125 are configured to receive the first parallel signal D1*c* and the second parallel signal D2*c* to output a first latched signal D1*d* and a second latched signal D2*d*. The first parallel signal D1*c* is latched by a first enable signal ENN1 and the second parallel signal D2*c* is latched by a second enable signal ENN2.

For the whole alignment and serialization process the first source 111 is considered the primary source. The corresponding first enable signal ENN1 does not need any special adjustments, therefore the first divided signal CK1div can be used as the first enable signal ENN1. The first enable signal ENN1 is derived from the first divided clock signal CK1div.

The data of the second source 121 (source 2) is aligned with the data of first source 111 (source 1) by dynamically adjusting the second enable signal ENN2. In order to do that, a phase detector is used to determine whether the second divided clock signal CK2div is early or late in relation to the first divided clock signal CK1div. As discussed in relation to FIG. 2A, if the second divided clock signal CK2div is late, the latch is set (e.g., immediately set) to its transparent mode so that the data can pass the second parallel signal D2*c* without further delay. On the other hand, as discussed in relation to FIG. 2B, if the second divided clock signal CK2div (and thus the second parallel signal D2*c*) is early, a second enable signal ENN2 is generated that delays the second parallel signal D2*c*. Since this decision, whether late or early, is made each second divided clock signal CK2div period, the system is capable of accommodating significant jitter between the first and second divided clock signals, the first divided clock signal CK1div and second divided clock signal CK2div, and thus can also handle substantial jitter between the original clock first clock signal CK1 and second clock signal CK2.

In this embodiment, the data processing circuit 105 may further comprise a phase detector 142 and an enable generator 143. The phase detector 142 is configured to identify a phase difference between the first divided clock signal CK1div and second divided clock signal CK2div and to produce a second divided clock late signal CK2divlate to the enable generator 143. The enable generator 143 receives the second divided clock signal CK2div and the second divided clock late signal CK2divLate from the phase detector 142 and to output the second enable signal ENN2 to the second latch 125. The second enable signal ENN2 is derived from the second divided clock signal CK2div and the second divided clock late signal CK2divLate. The second divided clock late signal CK2divlate should be understood to represent both early and late relationships between the clock signals.

The first synchronization circuit 153 is configured to synchronize the first parallel signal D1*c* directly. By latching the second parallel signal D2*c* with the second enable signal ENN2 from the phase detector 142 and the enable generator 143, the second parallel signal D2*c* is controlled to be aligned with the first parallel signal D1*c*.

During synchronizing the first latched signal D1*d* and second latched signal D2*d* to output a first synchronized signal D1*e* and second synchronized signal D2*e*, the first latched signal D1*d* and second latched signal D2*d* may be both synchronized by the first divided clock signal CK1div.

In some embodiments, the second divided clock signal CK2div may be realigned by an alignment monitor 141 that monitors the first divided clock signal CK1div and second divided clock signal CK2div. The alignment monitor 141 may continuously monitor the phase difference between the first divided clock signal CK1div and second divided clock signal CK2div and then trigger a realignment of the second clock divider 123 to reset it to a predetermined (e.g., optimal) position when the phase difference gets too large.

In some data transmission, this realignment may cause short data corruption (e.g., a few bits could get sent twice or deleted for the data of source 2 only). However, in the case of data with blanking phases, for example, D-PHY video data, this realignment can be performed during each blanking phase, during which no actual video data is transmitted. As these blanking phases exist frequently (e.g. after each video line), the methods and systems described herein can be utilized to perform the realignment during these blanking phases and maintain a high (e.g., a maximum) drift and/or jitter tolerance during operation. System implementations described herein enhance robustness against common signal transmission challenges, thereby improving reliability, reducing error rates, and facilitating smoother and more efficient data communication between interconnected components or systems. Through experimentation, the inventors have determined that even phase drifts beyond +/−N*UI are acceptable as long as the drift between the blanking phases stays below this value. Here, UI=1 bit period of the first serial data D1*a* and the second serial data D2*a*.

As illustrated in FIG. 1, in stage 1, the data is sampled by its correspondence clock. This ensures that the data is read using the optimal sampling point provided by the source. In addition, each of the first and second serial bitstreams (the first serial data D1*a* and second serial data D2*a*) is deserialized into packets of N bits. At that point, the N-bits packets (first N-bits signal D1*b* and second N-bits signal D2*b*) are output synchronously to the first divided clock signal CK1div and second divided clock signal CK2div, respectively. The first divided clock signal CK1div and second divided clock signal CK2div are derived from first clock signal CK1 and second clock signal CK2 by one or two suitable clock dividers (the first clock divider 113 and second clock divider 123). The divider may be characterized by a division ratio of M. M may be equal or not equal to N. M may be equal to N/2. N is the width of the first serial-to-parallel distributor 112 and second serial-to-parallel distributor 122.

In stage 2, the optional first latch and second latch can either simply pass the data (transparent latch) or delay the data depending on the applied enable signals ENN1 and/or ENN2 (low-active enable). By selecting suitable enable signals (ENN1, ENN2), the skew between the first latched signal D1*d* and second latched signal D2*d*, can be modified compared to the skew that exists between the first parallel signal D1*c* and second parallel signal D2*c*.

In stage 3, the aforementioned skew adjustment between the data lines enables to sample both the first latched signal D1*d* and second latched signal D2*d* with the same clock signal resulting in the first synchronized signal D1*e* and second synchronized signal D2*e*. These synchronous signals can then be serialized using conventional multiplexer/serializer circuits.

When two or more digital streams transmit through different data lanes, these data lanes experience differential skew and phase drifts. These inconsistencies can arise due to various factors, including temperature fluctuations, changes in supply voltage, or inherent discrepancies in the transmission media. Such variations can lead to misalignment of the video frames, resulting in degraded video quality, artifacts, or loss of synchronization between the transmitted and received video streams. Embodiments of the present invention exhibit a robust capability to operate effectively in environments characterized by large jitter and phase drifts between two data sources. According to empirical analyses conducted on actual clock and data sources, such as image sensors, the inventor has observed that the relative jitter, which refers to the variability in the time interval between data packets or signals, can be substantial between two sources. This variability can introduce challenges in maintaining data integrity and synchronization, necessitating advanced system design to mitigate these effects. Embodiments of the present invention are also designed to accommodate phase drifts and significant temporal misalignment/skew between the signals of two distinct data sources.

As described herein, embodiments of the present invention dynamically adjust and compensate for misalignment/skew, jitter and phase drifts. By doing so, the systems described herein maintain high fidelity in data acquisition and processing, ensuring that the integrity and accuracy of the data are preserved even in the face of significant skew, jitters, and phase drifts.

FIG. 2A illustrates waveforms corresponding to a second divided clock signal being late compared to a first divided clock signal according to an embodiment of the present invention. FIG. 2B illustrates waveforms corresponding to the second divided clock signal being early compared to the first divided clock signal according to an embodiment of the present invention. For the waveforms illustrated in FIGS. 2A and 2B, a Double Data Rate (DDR) clock is used, and the number of outputs N=6, which can be referred to as the 1-to-N (demux) ratio of the first serial-to-parallel distributor, e.g., 1-to-4 demux. Both the first serial-to-parallel distributor 112 and second serial-to-parallel distributor 122 have the number of outputs N=6. The division ratios M1 and M2 of the first clock divider 113 and second clock divider 123 are both 3. Thus, in the example illustrated in FIG. 2A, first serial data D1*a* is represented by a six bit, serial bitstream, and second serial data D2*a* is also represented by a six bit, serial bitstream. However, there values are merely exemplary and the division ratios M1 and M2, the number of outputs N, and the clock rate are not limited to these exemplary values and other values can be utilized. One of ordinary skill in the art would recognize many variations, modifications, and alternatives.

The waveforms illustrated in FIGS. 2A and 2B demonstrate the system's ability to handle jitter and phase drifts up to value+/−N*UI. In practice, the actual jitter/drift tolerance might be slightly less than this value due to the setup and hold times utilized by D-FFs and latches. Increasing the value of N can reduce the operating speed of system components and can enhance system tolerance by increasing timing margins, including handling of larger input skew and input jitter (e.g., dynamic skew and jitter) between the data sources. However, increasing the value of N will also increase complexity and the area utilized by the system since the number of first serial-to-parallel distributor 112 and first D-FF 114, as well as the number of second serial-to-parallel distributor 122 and second D-FF 124 (as well as the number of latches discussed herein) also increases.

Referring to FIGS. 1 and 2A, the six bit, serial bitstream represented by first serial data D1*a* is switched into the first serial-to-parallel distributor 112 by the rising and falling edges of first clock signal CK1. Accordingly, after three clock cycles, first parallel signal D1*c* including six bits is provided as shown in FIG. 2A. Similarly, the six bit, serial bitstream represented by second serial D2*a* is switched into the second serial-to-parallel distributor 122 by the rising and falling edges of second clock signal CK2. Accordingly, after three clock cycles, second parallel signal D2*c* including six bits is provided as shown in FIG. 2A. The temporal overlap between first parallel signal D1*c* and second parallel signal D2*c* is represented by $\tau$ (i.e., the time between $t_3$ and $t_4$) in FIG. 2A.

Referring to FIG. 2A, an example is illustrated in which the second divided clock signal CK2div is late with respect to the first divided clock signal CK1div. As shown in FIG. 2A, the rising edge of the first divided clock signal CK1div occurs at time $t_1$ whereas the rising edge of the second divided clock signal CK2div occurs at time $t_2$ due to the skew between the divided clock signals. In this case, the phase detector 142 will set second divided clock late signal CK2divLate to zero coincident with the rising edge of second divided clock signal CK2div, indicating that second latched signal D2*d* should be passed through the second latch 125 without delay, which is implemented by setting the second enable signal ENN2 to zero coincident with the rising edge of CK2div. Thus, as illustrated in FIG. 2A, the second latched signal D2*d* is output by the second latch 125 at time $t_2$, which is coincident with second parallel signal D2*c*. Accordingly, the first latched signal D1*d* and second latched signal D2*d* overlap during time $\tau_1$. As illustrated in FIG. 1, the third D-FF 116 and the fourth D-FF are both enabled by CK1div. As a result, as shown in FIG. 2A, first synchronized signal D1*e* and second synchronized signal D2*e* are aligned with the rising edge of first divided clock signal CK1div at time $t_4$ and are synchronized.

As discussed more fully below, embodiments of the present invention are robust in applications where the skew between the first parallel signal D1*c* and second parallel signal D2*c* are within a range of +/−N*UI, where UI=1 bit. As illustrated in FIG. 2A, the skew between first parallel signal D1*c* and second parallel signal D2*c* is less than 6 UI. Since the period of first parallel signal D1*c* and second parallel signal D2*c* are equal to 6 UI, the skew is less than the period, resulting in a temporal overlap between first parallel signal D1*c* and second parallel signal D2*c*.

Referring to FIG. 2B, an example is illustrated in which the second divided clock signal CK2div is early with respect to the first divided clock signal CK1div. As shown in FIG. 2B, the rising edge of the second divided clock signal CK2div occurs at time $t_1$, whereas the rising edge of the first divided clock signal CK1div occurs at time $t_2$, due to the skew between the divided clock signals. Thus, as shown in FIG. 2B, output of second parallel signal D2*c* by second D-FF 124 occurs at time $t_1$, before output of first parallel signal D1*c* by first D-FF 114 at time $t_{2''}$. In this case, the phase detector 142 will set second divided clock late signal CK2divLate to zero at time $t_{3''}$, which results in the second latched signal D2*d* also being output by the second latch 125 at time $t_{3''}$. As a result, the second latched signal D2*d* output at time $t_{3'}$ and first latched signal D1*d* output at time $t_{4'}$ are more closely aligned (i.e., are characterized by reduced skew) than second parallel signal D2*c* and first parallel signal D1*c* were aligned. Accordingly, the second latched signal D2*d* and first latched signal D1*d* overlap during time τ'. As illustrated in FIG. 1, the third D-FF 116 and the fourth D-FF are both enabled by CK1div. As a result, as shown in FIG. 2B, first synchronized signal D1*e* and second synchronized signal D2*e* are aligned with the rising edge of first divided clock signal CK1div at time $t_{5'}$ and are synchronized.

Comparing FIGS. 2A and 2B, the overlap between first parallel signal D1*c* and second parallel signal D2*c* is still within the range of +/−N*UI, i.e., between −N*UI and zero, since second parallel signal D2*c* is earlier than first parallel signal D1*c*. Accordingly, embodiments of the present invention provide systems that can synchronize signals over a range of skews ranging from −N*UI to +N*UI, i.e., +/−N*UI.

Figure 3:
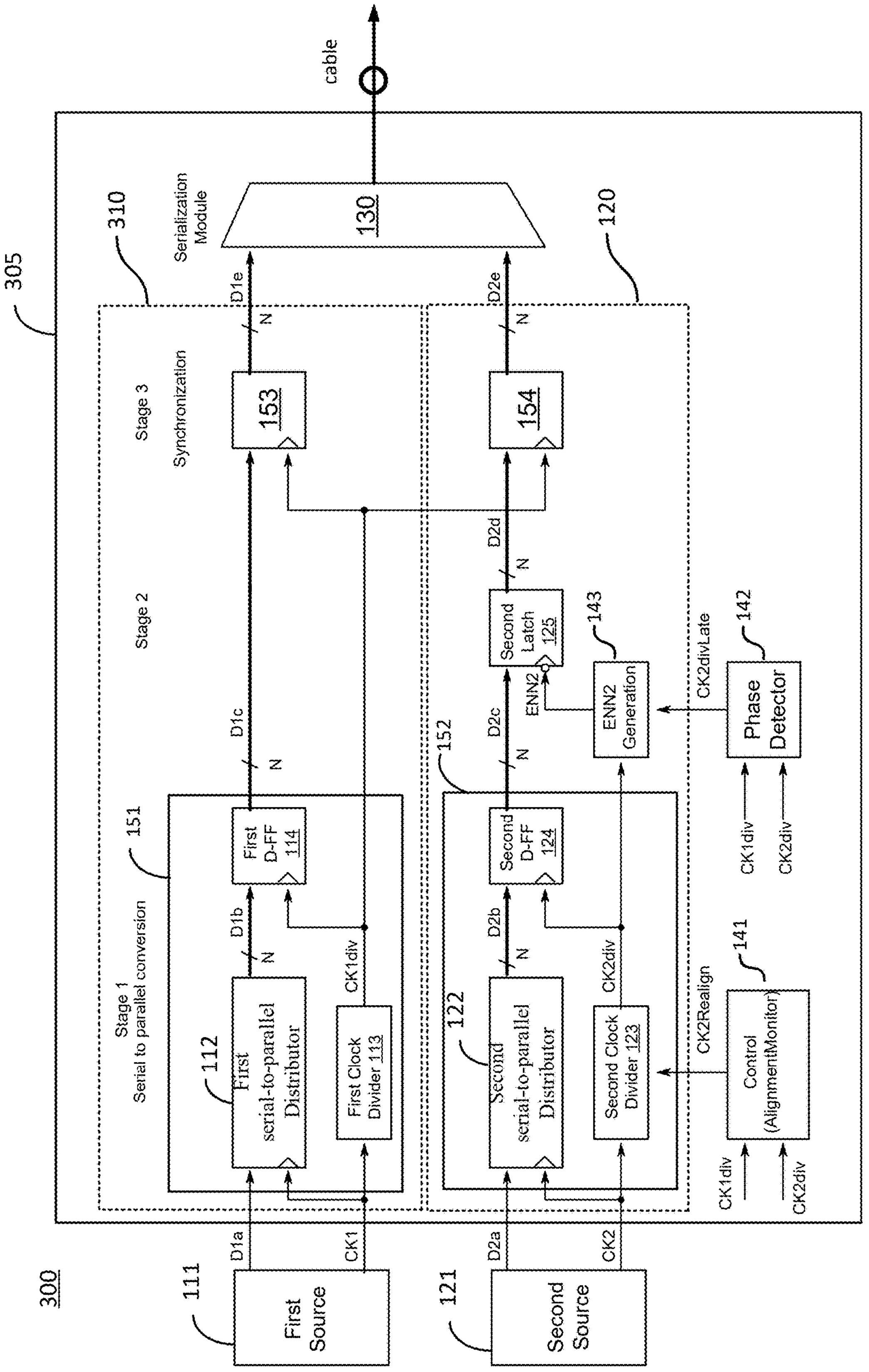
FIG. 3 illustrates a system with one latch for serializing data produced using two independent clock and data sources into a single bitstream according to an embodiment of the present invention.

In the embodiment where the system comprises only the second latch, excluding the first latch as illustrated in FIG. 3, when the second divided clock signal CK2div is late, for example, the phase detector 142 detecting result is that the second divided clock signal CK2div is later than the first divided clock signal CK1div, resulting in a delayed second parallel signal D2*c*, the second enable signal ENN2 immediately sets the second latch 125 to its transparent mode so that the second parallel signal D2*c* can pass the second latch 125 without further delay, therefore, the second parallel signal D2*c* is modified to a second latched signal D2*d*.

In the embodiment where both the first latch and second latches are included as illustrated in FIG. 1, the skew between the first latched signal D1*d* and the second latched signal D2*d*, can also be modified by the first latch 115 and the second latch 125, compared to the skew that exists between the first parallel signal D1*c* and the second parallel signal D2*c*.

During the synchronizing step, the first latched signal D1*d* and second latched signal D2*d* are synchronized by the third D-FF 116 and fourth D-FF 126 and both of which are based on the first divided clock signal CK1div. Therefore, the first latched signal D1*d* and second latched signal D2*d* are synchronized to become the first synchronized signal D1*e* and second synchronized signal D2*e*, respectively.

FIG. 2A illustrates a digital timing diagram of the circuit discussed above when phase detector detecting result is that the second clock divided signal CK2div is late. In this specific diagram, the first serial data D1*a* and second serial data D2*a* shown in FIG. 2A are both six bit packets. However, this is just for example, the number of bits of the packets is not limited to 6. In the parallelizing step, the six bit packets first serial data D1*a* and second serial data D2*a* are synchronously output to the first parallel signal D1*c* and second parallel signal D2*c*, respectively. This is done using a first divided clock CK1div for first serial data D1*a* and a second divided clock CK2div for second serial data D2*a*.

As discussed above, FIG. 2B illustrates a digital timing diagram of the circuit discussed above when the phase detector detects that the second divided clock signal CK2div is early. Further to the discussion above, when the second divided clock signal CK2div is early, leading to an early second parallel signal D2*c*, the system generates a second enable signal ENN2 that delays the second parallel signal D2*c*. The second latch 125 is set, e.g., immediately set, to its delayed mode so that the second parallel signal D2*c* can be delayed passing the second latch. Therefore, the second parallel signal D2*c* is modified to a second latched signal D2*d*. The skew between the first latched signal D1*d* (or D1*c*, wherein the first latch 115 is not included) and the second latched signal D2*d*, can be modified compared to the skew that exists between the first parallel signal D1*c* and second parallel signal D2*c*.

In this specific diagram, the first serial data D1*a* and second serial data D2*a* shown in FIG. 2B are both six bit packets. However, this is merely exemplary and the number of bits in the packets is not limited to 6 bits.

During parallelizing of the six bit packets first serial data D1*a* and second serial data D2*a*, both the first serial data D1*a* and second serial data D2*a* are output synchronously in conjunction with a first divided clock signal CK1div and a second divided clock signal CK2div, respectively, as the first parallel signal D1*c* and the second parallel signal D2*c*. When the second divided clock signal CK2div occurs early, leading to an earlier second parallel signal D2*c*, a second enable signal ENN2 is generated that delays the second parallel signal D2*c*. The second latch 125 is then set, e.g., immediately set, to its delayed mode so that the second parallel signal D2*c* can be delayed passing the second latch. Therefore, the second parallel signal D2*c* is modified to a second latched signal D2*d*. The skew between the first latched signal D1*d* (e.g., the first parallel signal D1*c* if the first latch 115 is not included) and second latched signal D2*d*, can be modified compared to the skew that exists between the first parallel signal D1*c* and second parallel signal D2*c*. During the synchronization process, the first latched signal D1*d* and second latched signal D2*d* are both synchronized by the first divided clock signal CK1div. Then, the first latched signal D1*d* and second latched signal D2*d* are synchronized as the first synchronized signal D1*e* and second synchronized signal D2*e*.

A significant advantage provided by embodiments of the present invention and the methods of serializing data from two distinct sources as illustrated in FIG. 1, lies in its area and power-efficient implementation. This efficiency not only contributes to reducing or minimizing the physical footprint and energy consumption of the system but also enhances its compatibility with low-cost CMOS technologies. By leveraging this solution, developers can achieve a delicate balance between performance, efficiency, and cost, making it an ideal choice for a wide range of applications that provide reliable data serialization from multiple sources.

Furthermore, the versatility of the methods and systems described herein may extend to their compatibility with both Single Data Rate (SDR) and Double Data Rate (DDR) clocks. This adaptability enables embodiments of the present invention to cater to a wide spectrum of applications, ranging from traditional SDR environments, which prioritize simplicity and cost-effectiveness, to more advanced DDR scenarios, where higher throughput and efficiency are achieved. For the SDR applications, M may be equal to N (M=N). For the DDR applications, M may be equal to N/2 (M=N/2). N is generally a multiple of 2 (as shown in the example waveforms in FIGS. 2A and 2B), but is not limited to a multiple of 2. One of ordinary skill in the art would recognize many variations, modifications, and alternatives.

FIG. 3 illustrates a system with one latch for serializing data produced using two independent clock and data sources into a single bitstream according to an embodiment of the present invention. The system 300 illustrated in FIG. 3 shares common elements with the system 100 illustrated in FIG. 1. Accordingly, the description provided in relation to system 100 illustrated in FIG. 1 is applicable to the system 300 illustrated in FIG. 3 as appropriate.

Referring to FIG. 3, the data processing circuit 305 only utilizes the second latch 125 (i.e., the first latch 115 illustrated in FIG. 1 is not utilized in the first circuit 310 in this embodiment) and all other components can be the same as those illustrated in FIG. 1.

In the embodiment illustrated in FIG. 3 in which the system 300 utilizes only the second latch but not the first latch, one source (Source 1) is considered the primary source and the whole alignment and serialization process, as well as the intermediate latching of stage 2 (first latch 115) may be skipped for the primary source.

Compared to the existing solutions to these problems that often involve complex hardware arrangements or extensive calibration procedures, which can be cost-prohibitive and may not dynamically adapt to changing conditions, embodiments of the present invention provide better performance under varying operational environments.

Figure 4:
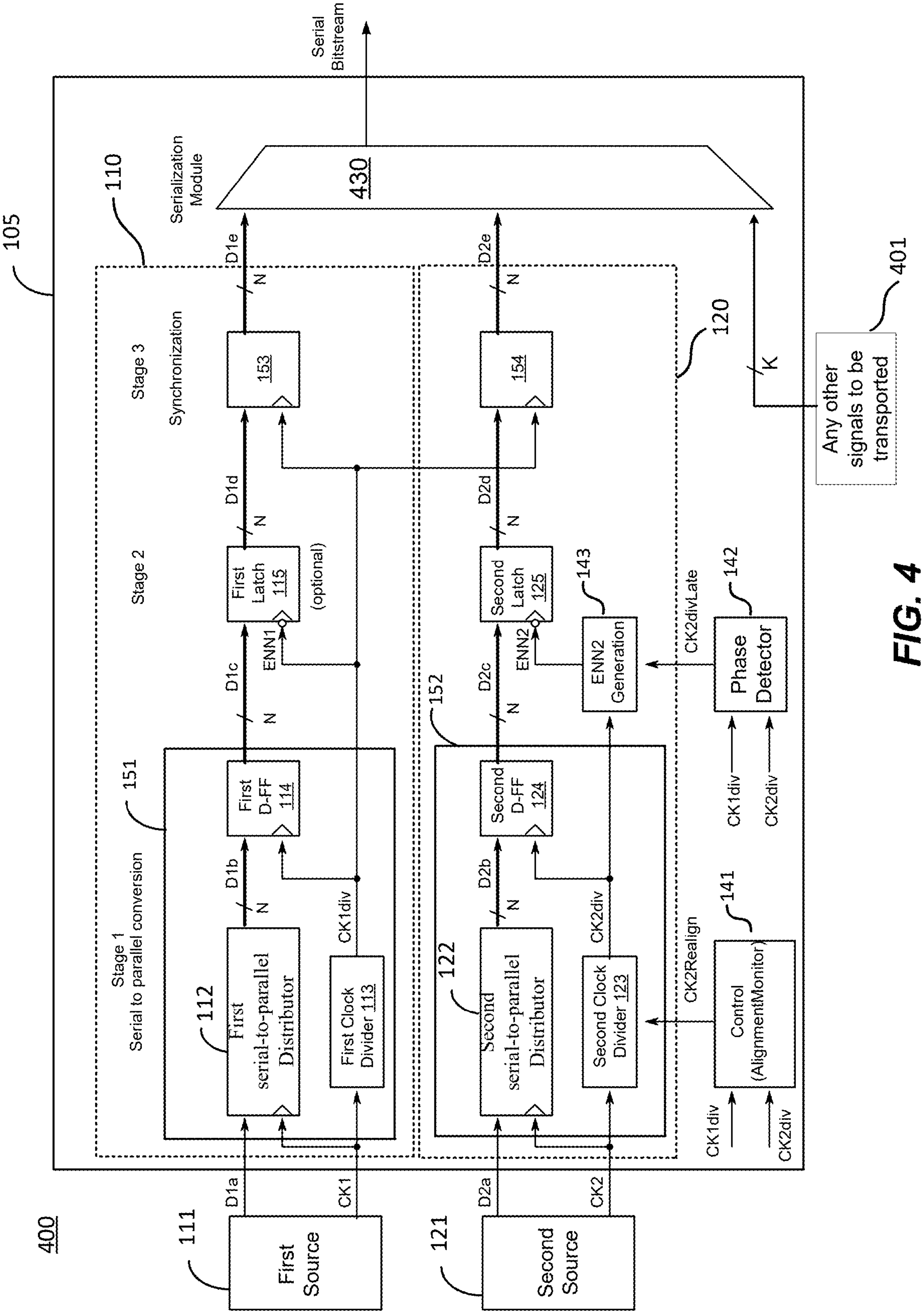
FIG. 4 illustrates an alternative system for serializing data produced using two independent clock and data sources and other signals into a single bitstream according to an embodiment of the present invention.

FIG. 4 illustrates an alternative system for serializing data produced using two independent clock and data sources and other signals into a single bitstream according to an embodiment of the present invention. The system 400 illustrated in FIG. 4 shares common elements with the system 100 illustrated in FIG. 1. Accordingly, the description provided in relation to system 100 illustrated in FIG. 1 is applicable to the system 400 illustrated in FIG. 4 as appropriate.

Although the serialization module 130 illustrated in FIG. 1 multiplexes only the first synchronized signal D1*e* and second synchronized signal D2*e*, this is not required by embodiments of the present invention. In the alternative embodiment illustrated in FIG. 4, in addition to the first synchronized signal D1*e* and second synchronized signal D2*e*, the serialization module 430 multiplexes additional signals (i.e., any other signals to be transported 401 together with the first synchronized signal D1*e* and second synchronized signal D2*e*. Thus, the serialization module 430 is configured to receive the first synchronized signal D1*e*, the second synchronized signal D2*e*, and the other signals to be transported and to output a serial bitstream including all these signals. The serialization module 430 may be any suitable multiplexer/serializer circuit.

Figure 5:
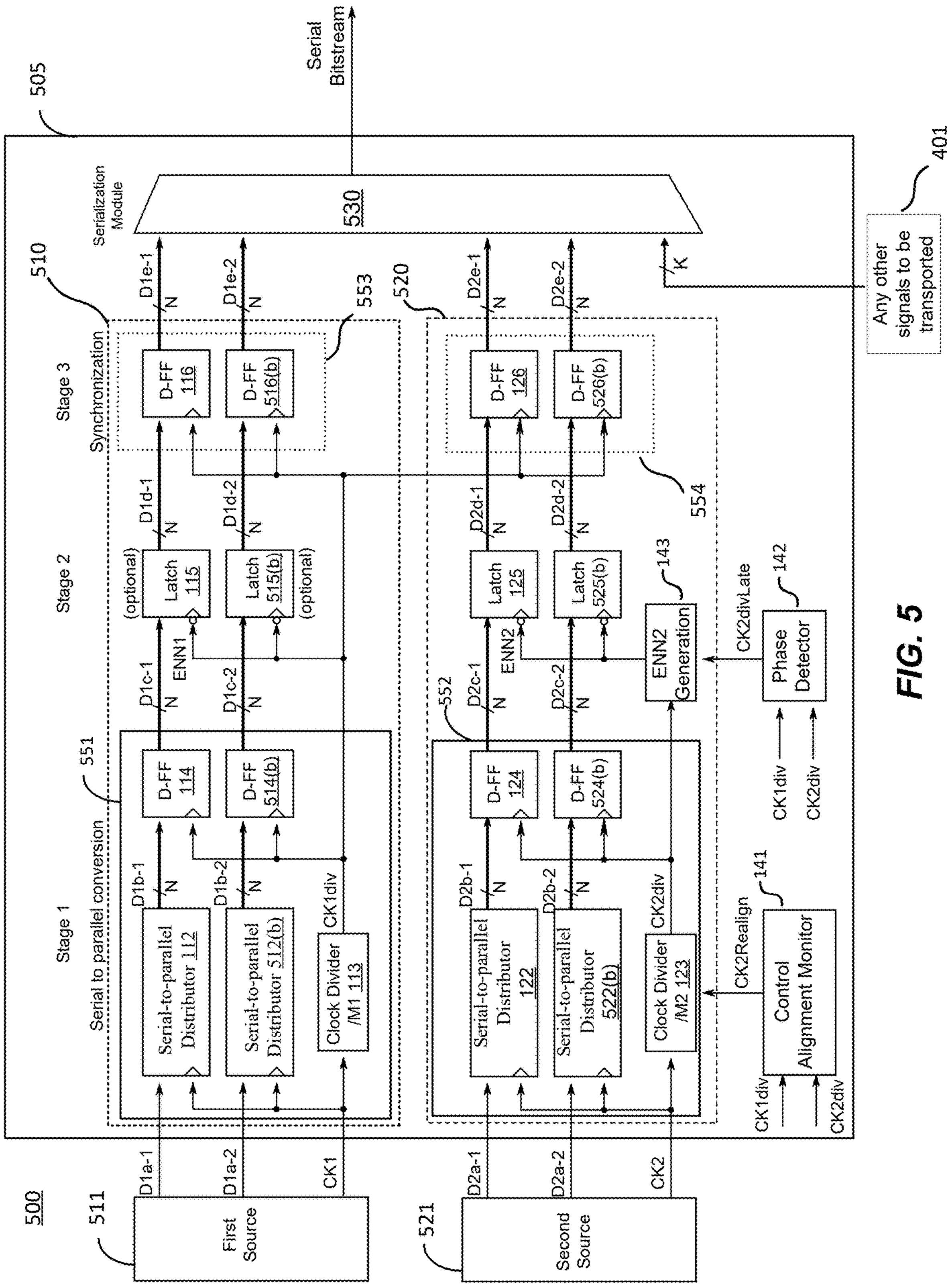
FIG. 5 illustrates an embodiment of the system illustrated in FIG. 4 in which each source has two signal lanes.

FIG. 5 illustrates an embodiment of the system illustrated in FIG. 4 in which each source has two signal lanes. Although FIG. 1 illustrated that the first serial data D1*a* and the second serial data D2*a* produced by the first source 111 and the second source 121 were each provided in a single data lane, the serial data may be produced in multiple data lanes. In the embodiment illustrated in FIG. 5, the first source 511 outputs the first serial data D1*a* using two data lanes: a first serial lane data D1*a*-1 and a second serial lane data D1*a*-2, and the second source 521 outputs the second serial data D2*a* including a third serial lane data D2*a*-1 and a fourth serial lane data D2*a*-2.

As illustrated in FIG. 5, the system 500 includes a data processing circuit 505, a first source 511, and a second source 521. The data processing circuit 505 includes a first circuit 510 that connects the first source 511 to a serialization module 530, and a second circuit 520 that connects the second source 521 to the serialization module 530. The serialization module 530 may be a multiplexer, a shift register, a digital signal processor (DSP), an application specific integrated circuit (ASIC), or the like.

The first source 511 and the second source 521 can be various sources of data, including image sensors, cameras, or the like. The first source 511 and the second source 521 produce independent bit streams, and each source produces two bit streams, for example, a stereo-camera application with two cameras using the same resolution. The four bit streams are combined to form a single serial bitstream. The serial bitstream can then be communicated using a serial link, for example, an optical fiber, an electrical conductor such as copper wire, or the like to another electronic or optoelectronic system.

In some embodiments, first source 511 and second source 521 are operated at a same bit rate. Although first source 511 and second source 521 can be operated at the same bit rate, these sources can be characterized by skew, jitter, and the like, as discussed above.

The first circuit 510 is configured to connect the first source 511 to the serialization module 530. The first source 511 produces two lanes of bit streams including a first serial lane data D1*a*-1 and a second serial lane data D1*a*-2, both outputs along with the first clock signal CK1. The first circuit 510 is configured to receive the first serial lane data D1*a*-1 and the second serial lane data D1*a*-2 and a first clock signal CK1 from the first source 511 and to produce a first lane synchronized signal D1*e*-1 and second lane synchronized signal D1*e*-2 to the serialization module 530. In addition to the first serial-to-parallel distributor 112 and the first D-FF 114, a first lane serial-to-parallel distributor 512(*b*), also referred to as a third serial-to-parallel distributor, and a first lane D-FF 514(*b*), also referred to as a fifth D-FF, are also included to correspond to the number of data lanes produced by the first source 511.

The first circuit 510 comprises a first parallel conversion circuit 551, which can also be referred to as a Stage 1 serial-to-parallel conversion circuit, that is operable to convert the serial data produced by the first source 511 into parallel data, and a first synchronization circuit 553, which can also be referred to as a Stage 3 synchronization circuit, both of which will be described more fully below.

The first parallel conversion circuit 551 includes a first serial-to-parallel distributor 112, a first lane serial-to-parallel distributor 512(*b*), a first clock divider 113, a first D-FF 114, and a first lane D-FF 514(*b*). The first serial-to-parallel distributor 112 and first lane serial-to-parallel distributor 512(*b*) may be N-bit Shift Registers, demultiplexers, or the like. The first clock divider 113 has a division ratio of M1. The first serial-to-parallel distributor 112 is configured to receive the first serial data D1*a*-1 and the first clock signal CK1 and to output a first lane N-bits signal D1*b*-1, where N is a positive integer. The first lane serial-to-parallel distributor 512(*b*) is configured to receive the first serial data D1*a*-2 and the first clock signal CK1 and to output a second lane N-bits signal D1*b*-2. The first clock divider 113 is configured to receive the first clock signal CK1 and to output a first divided clock signal CK1div. The first D-FF 114 is configured to receive the first lane N-bits signal D1*b*-1 and the first divided clock signal CK1div and to output a first lane parallel signal D1*c*-1. The first lane D-FF 514(*b*) is configured to receive the second lane N-bits signal D1*b*-2 and the first divided clock signal CK1div and to output a second lane parallel signal D1*c*-2. The first clock divider's division ratio M1 may be the same as or different from the size N of the first serial-to-parallel distributor 112. The first serial-to-parallel distributor 112, first lane serial-to-parallel distributor 512(*b*), first D-FF 114, and first lane D-FF 514(*b*) may be similar to the serial-to-parallel distributor and D-FF illustrated in FIG. 1 and FIG. 4. Thus, the first lane parallel signal D1*c*-1 and second lane parallel signal D1*c*-2 at the output of first parallel conversion circuit 551 represent the conversion of the one-bit signals (i.e., the first lane serial data D1*a*-1 and the second lane serial data D1*a*-2 at a predetermined bit rate) into N-bit, parallel signals characterized by a lower bit rate than the predetermined bit rate. Thus, as described more fully below, embodiments enable the alignment of first lane latched signal D1*d*-1, second lane latched signal D1*d*-2, third lane latched signal D2*d*-1 and fourth lane latched signal D2*d*-2 at lower speeds than the rate corresponding to the initial serial data streams, thereby reducing system requirements.

The first synchronization circuit 553 comprises a third D-FF 116 and a third lane D-FF 516(*b*). The third D-FF 116 and third lane D-FF 516(*b*) are configured to receive the first lane parallel signal D1*c*-1, second lane parallel signal D1*c*-2, and the first divided clock signal CK1div and to output the first lane synchronized signal D1*e*-1 and second lane synchronized signal D1*e*-2 to the serialization module 530.

The first circuit 510 may also include a first latch 115 and a first lane latch 515(*b*) connected between the first parallel conversion circuit 551 and the first synchronization circuit 553. The first latch 115 is optional in some embodiments. When the first latch 115 and first lane latch 515(*b*) are utilized, the first latch 115 and first lane latch 515(*b*) are configured to receive the first lane parallel signal D1*c*-1 and second lane parallel signal D1*c*-2, and a first enable signal ENN1 and to produce the first lane latched signal D1*d*-1 and second lane latched signal D1*d*-2. The first synchronization circuit 553 is configured to receive the first lane latched signal D1*d*-1 and second lane latched signal D1*d*-2, and the first divided clock signal CK1div and to output a first lane synchronized signal D1*e*-1 and a second lane synchronized signal D1*e*-2 to the serialization module 530. The first enable signal ENN1 may be the first divided clock signal CK1div.

The second circuit 520 is configured to connect a second source 521 to the serialization module 530. The second circuit 520 is configured to receive a third lane serial data D2*a*-1, a fourth lane serial data D2*a*-2, and a second clock signal CK2 from the second source 521, and to output a third synchronized signal D2*e*-1 and a fourth synchronized signal D2*e*-2 to the serialization module 530. The second circuit 520 includes a second parallel conversion circuit 552, a second latch 125, a second lane latch 525(*b*), and a second synchronization circuit 554.

The second parallel conversion circuit 552 comprises a second serial-to-parallel distributor 122, a second lane serial-to-parallel distributor 522(*b*), a second clock divider 123, a second D-FF 124, and a second lane D-FF 524(*b*). The second clock divider 123 has a division ratio of M2, wherein M2 is a positive integer. Each of the second serial-to-parallel distributor 122 and the second lane serial-to-parallel distributor 522(*b*) may comprise an N-bit Shift Register, a demultiplexer, or the like. The second serial-to-parallel distributor 122 and second lane serial-to-parallel distributor 522(*b*) are configured to receive a third lane serial data D2*a*-1, a fourth lane serial data D2*a*-2 and the second clock signal CK2 and to produce a third lane N-bits signal D2*b*-1 and a fourth lane N-bits signal D2*b*-2. The second clock divider 123 is configured to receive the second clock signal CK2 and to output a second divided clock signal CK2div. The second D-FF 124 and second lane D-FF 524(*b*) are configured to receive the third lane N-bits signal D2*b*-1, fourth lane N-bits signal D2*b*-2, and the second divided clock signal CK2div, and to output a third lane parallel signal D2*c*-1 and a fourth lane parallel signal D2*c*-2 to the second latch 125 and the second lane latch 525(*b*). The second latch 125 and the second lane latch 525(*b*) are configured to receive the third lane parallel signal D2*c*-1, fourth lane parallel signal D2*c*-2, and a second enable signal ENN2 and to output a third lane latched signal D2*d*-1 and fourth lane latched signal D2*d*-2. The second latch 125 and second lane D-FF 524(*b*) introduce a delay or pass the data (in a transparent mode of operation) as described more fully herein. The second latch 125 and second lane D-FF 524(*b*) can delay the third lane parallel signal D2*c*-1 and the fourth lane parallel signal D2*c*-2 in order to provide the third lane latched signal D2*d*-1 and the fourth lane latched signal D2*d*-2 in a delayed manner that enables alignment (i.e., temporal alignment) of first lane parallel signal D1*c*-1 and second lane parallel signal D1*c*-2 or first lane latched signal D1*d*-1 and second lane latched signal D1*d*-2 with the third lane latched signal D2*d*-1 and fourth lane latched signal D2*d*-2. In other cases, the second latch 125 passes the third lane parallel signal D2*c*-1 without delay to provide the third lane latched signal D2*d*-1. The second lane latch 525(*b*) passes the fourth lane parallel signal D2*c*-2 without delay to provide the fourth lane latched signal D2*d*-2. The division ratio M2 of the second clock divider 123 may be the same as or different from the size N of the second serial-to-parallel distributor 122 and the second lane serial-to-parallel distributor 522(*b*). The division ratio M2 of the second clock divider 123 may be the same as the division ratio M1 of the first clock divider 113.

The second synchronization circuit 554 comprises a fourth D-FF 126 and a fourth lane D-FF 526(*b*). The fourth D-FF 126 and fourth lane D-FF 526(*b*) are configured to receive the third lane latched signal D2*d*-1, fourth lane latched signal D2*d*-2, and the first divided clock signal CK2div and to output a third lane synchronized signal D2*e*-1 and a fourth lane synchronized signal D2*e*-2 to serialization module 530.

The serialization module 530 is configured to receive the first lane synchronized signal D1*e*-1, second lane synchronized signal D1*e*-2, third lane synchronized signal D2*e*-1, and fourth lane synchronized signal D2*e*-2, and to output a serial bitstream. The serialization module 530 may be any multiplexer/serializer circuit.

The system 500 illustrated in FIG. 5 shares common elements, alignment monitor 141, phase detector 142, enable generator 143, and any other signals to be transported 401, with system 100 illustrated in FIG. 1 and system 400 illustrated in FIG. 4. Accordingly, the description provided in relation to system 100 and system 400 illustrated in FIGS. 1 and 4 are applicable to the system 500 illustrated in FIG. 5 as appropriate.

Figure 6:
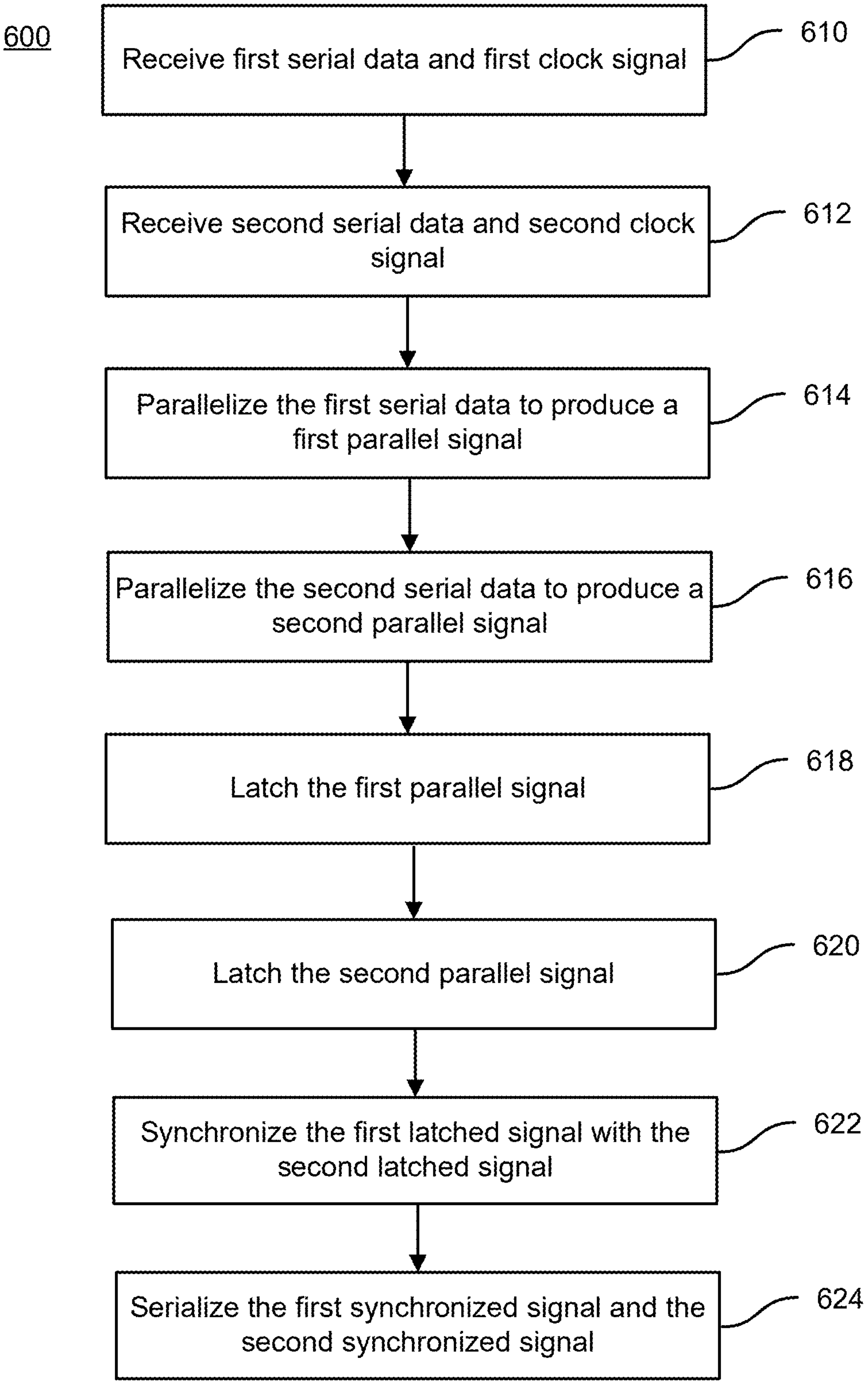
FIG. 6 is a simplified flowchart illustrating a method of serializing data according to an embodiment of the present invention.

FIG. 6 is a simplified flowchart illustrating a method of serializing data according to an embodiment of the present invention. The method 600 includes receiving a first serial data and a first clock signal from a first source (610) and receiving a second serial data and a second clock signal from a second source (612). The method also includes parallelizing the first serial data to produce a first parallel signal (614) and parallelizing the second serial data to produce a second parallel signal (616). In some embodiments, parallelizing the first serial data comprises sampling the first serial data by the first clock signal and deserializing the first serial data into a first packet of N-bits signal and synchronizing the first packet of N-bits signal to a first divided clock signal, wherein the first divided clock signal is derived from the first clock signal by a first clock divider. Moreover, parallelizing the second serial data can include sampling the second serial data by the second clock signal and deserializing the second serial data into a second N-bits signal and synchronizing the second N-bits signal to a second divided clock signal, wherein the second divided clock signal is derived from the second clock signal by a second clock divider.

The method further includes latching the first parallel signal, using a first enable signal, to produce a first latched signal (618) and latching the second parallel signal, using a second enable signal, to produce a second latched signal (620). In some embodiments, the second enable signal is derived from a second divided clock signal and a second divided clock late signal. The second divided clock late signal can be defined by a time difference between a first divided clock signal and the second divided clock signal. The first enable signal can be equal to the first divided clock signal.

Moreover, the method includes synchronizing the first latched signal with the second latched signal to produce a first synchronized signal and a second synchronized signal (622) and serializing the first synchronized signal and the second synchronized signal to produce a serial bitstream (624). Synchronizing the first parallel signal can include synchronizing the first parallel signal by a first divided clock signal, and synchronizing the second latched signal can include synchronizing the second latched signal by a first divided clock signal. Latching the first parallel signal can be performed prior to synchronizing the first parallel signal. The method can also include realigning the second divided clock signal to align with the first divided clock signal. Moreover, in some embodiments, the method includes detecting a phase delay between the first divided clock signal and the second divided clock signal and generating the second latched signal based on the phase delay.

The first serial data can include at least two data lanes of serial data and the second serial data can include at least two data lanes of serial data. In these embodiments, parallelizing comprises parallelizing the first serial data and the second serial data, latching comprises latching each data lane of the second parallel signal, synchronizing comprises synchronizing each data lane of the first parallel signal and synchronizing each data lane of the second latched signal, and serializing comprises serializing each data lane of the first synchronized signal and each data lane of the second synchronized signal to produce the serial bitstream. In some alternative embodiments, the method includes serializing one or more additional signals, wherein the serial bitstream includes the first synchronized signal, the second synchronized signal, and the one or more additional signals.

It should be appreciated that the specific steps illustrated in FIG. 6 provide a particular method of serializing data according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

In one embodiment, the system addresses the aforementioned challenges for the transmission of two video data sources (although a greater number of video sources can be utilized) that separately and dynamically compensates for arbitrary skew and phase drifts, as well as misalignment issues, thereby ensuring high-quality video transmission even under varying environmental conditions. The system can include two cameras, a data processing circuit as illustrated in FIG. 1, and a transmission cable. The two cameras may be a dual-lane video transmission unit, which is responsible for encoding and transmitting video data over two separate lanes. The data processing circuit is configured to dynamically adjust the timing and alignment of the data lanes based on real-time feedback, effectively mitigating the effects of jitter, skew, phase drifts, and misalignment. The data processing circuit manages the integrity of video data transmitted over dual lanes. Each video lane operates independently, transmitting serial bitstreams first serial data D1*a* and second serial data D2*a*, with corresponding clock line first clock signal CK1 and second clock signal CK2. The data processing circuit detects and quantifies any skew or phase drift between the lanes, attributed to temperature variations, supply voltage instability, or other external factors. The data processing circuit serialized the adjusted dual lanes into a serial bitstream to the transmission cable. The system serializes two data sources into one data stream and reduces the number of required lanes (cost/area savings) compared to a solution that has to transmit the data of both sources separately.

The data is not limited to video data like the aforementioned embodiments. The data stream includes different types of data, e.g., visual, audio, binary information encoded using encoding methods, e.g., MPEG, JPEG, H.264 for video data; PCM, AAC for audio data; other relevant encoding for computer data. The data comprises digital signals formatted according to specific communication protocol or standard, suitable for transmission via different types of cable, e.g., coaxial, optical fiber, HDMI, USB. This output configuration is designed for seamless integration with applications or system, e.g., broadcasting systems, networked computing environments, multimedia display systems, facilitating real-time or buffered transmission of high-quality data streams.

The data processing circuit is adeptly engineered to manage significant temporal misalignments or skew between two distinct data sources, even when both utilize the same reference clock, by accommodating an arbitrary level of skew in their data and clock signals. Such skew can arise from factors like signal propagation delays, differences in circuit path lengths, or variances in processing speeds, which can lead to misalignment between transmitted data and clock signals. The system's robust architecture employs advanced algorithms and synchronization mechanisms to ensure data integrity and synchronization, effectively handling large skews between data sources.

Moreover, the system is capable of operating in environments with substantial jitter and phase drifts between data sources. Empirical analyses on real clock and data sources, like image sensors, have shown significant variability in the time interval between data packets or signals, posing challenges to data integrity and synchronization. The system accommodates phase drifts, which can be induced by external factors like temperature fluctuations or supply voltage changes, causing propagation delay changes. By dynamically adjusting to compensate for both jitter and phase drifts, the system maintains high data fidelity, ensuring data integrity and accuracy despite these challenges.

Another advanced feature of the system is its automatic detection of misalignment and subsequent realignment, ensuring operational continuity even under dynamic conditions. It can autonomously identify and correct deviations in data stream alignment due to skew changes or drift phenomena, minimizing the need for manual intervention and enhancing system reliability and efficiency. For video data, automatic realignment during blanking phases increases tolerance to drifts between data sources without causing video data corruption.

The system's compatibility with a broad spectrum of clocking technologies, including both Single Data Rate (SDR) and Double Data Rate (DDR) clocks, allows the system to integrate seamlessly into diverse technological environments, from traditional setups requiring simple data transfer rates to more advanced applications demanding higher throughput and efficiency.

Designed for power and area efficiency, the system is a desired (e.g., an optimal) choice for integration into systems prioritizing resource conservation and compactness, especially beneficial in the context of low-cost CMOS technologies. This efficiency reduces manufacturing costs and aligns with industry trends toward sustainable and economically viable electronic solutions, facilitating the development of high-performance, cost-effective, and environmentally conscious electronic products. The design extends beyond accommodating just two sources and it may be modified to support multiple data sources, not limited to a binary configuration. This scalability allows for a broader range of applications and more complex data integration scenarios, where data from numerous sources needs to be serialized and processed efficiently. By not limiting the system to only two inputs, embodiments of the present invention opens up possibilities for more extensive and versatile data handling capabilities, catering to the growing demands for systems that can manage data from an increasingly diverse array of sensors, devices, and information streams in today's interconnected digital landscape.

Various features described herein, e.g., methods, apparatus, computer readable media and the like, can be realized using a combination of dedicated components, programmable processors, and/or other programmable devices. Some processes described herein can be implemented on the same processor or different processors. Where some components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Details are given in the above description to provide an understanding of the embodiments. However, it is understood that the embodiments may be practiced without some of the specific details. In some instances, well-known circuits, processes, algorithms, structures, and techniques are not shown in the figures.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A data processing circuit comprising:
- a first circuit comprising:
  - a first parallel conversion circuit comprising:
    - a first serial-to-parallel distributor;
    - a first clock divider characterized by a division ratio M; and
    - a first D-type Flip Flop (D-FF); and
  - a first synchronization circuit coupled to the first parallel conversion circuit;
- a second circuit comprising:
  - a second parallel conversion circuit comprising:
    - a second serial-to-parallel distributor;
    - a second clock divider characterized by the division ratio M; and
    - a second D-FF;
  - a second latch coupled to the second parallel conversion circuit; and
  - a second synchronization circuit coupled to the second latch; and
- a serialization module coupled to the first synchronization circuit and the second synchronization circuit.

2. The data processing circuit of claim 1, wherein:
- the first circuit further comprises a first latch coupled to the first parallel conversion circuit and the first clock divider, wherein the first synchronization circuit is coupled to the first latch; and
- a first latching signal of the first latch is equal to a first divided clock signal of the first clock divider.

3. The data processing circuit of claim 1, wherein the first serial-to-parallel distributor and the first clock divider are coupled to a first source, and the first D-FF is coupled to the first serial-to-parallel distributor and the first clock divider.

4. The data processing circuit of claim 3, wherein the first source comprises at least one of a camera, microphone, or sensor.

5. The data processing circuit of claim 3, wherein the first parallel conversion circuit further comprises:

a third serial-to-parallel distributor coupled to the first source; and a fifth D-FF coupled to the third serial-to-parallel distributor and the first clock divider.

6. The data processing circuit of claim 1, wherein the first serial-to-parallel distributor or the second serial-to-parallel distributor comprises an N-bit Shift Register.

7. The data processing circuit of claim 6, wherein the division ratio M is equal to N or N/2.

8. The data processing circuit of claim 1, wherein the first serial-to-parallel distributor or the second serial-to-parallel distributor comprises a demultiplexer.

9. The data processing circuit of claim 1, further comprising an alignment monitor coupled to the first clock divider and the second clock divider.

10. The data processing circuit of claim 1, further comprising:

a phase detector coupled to the first clock divider and the second clock divider; and an enable generator coupled to the phase detector and the second clock divider;

wherein the second latch is coupled to the enable generator.

11. The data processing circuit of claim 1, wherein the first synchronization circuit further comprises a third D-FF, wherein the third D-FF is coupled to the first D-FF and the first clock divider and the serialization module is coupled to the third D-FF.

12. A method of serializing data, the method comprising:

receiving a first serial data and a first clock signal from a first source;

receiving a second serial data and a second clock signal from a second source;

parallelizing the first serial data to produce a first parallel signal;

in parallelizing the second serial data to produce a second parallel signal;

latching the first parallel signal, using a first enable signal, to produce a first latched signal;

latching the second parallel signal, using a second enable signal, to produce a second latched signal;

synchronizing the first latched signal with the second latched signal to produce a first synchronized signal and a second synchronized signal; and serializing the first synchronized signal and the second synchronized signal to produce a serial bitstream.

13. The method of claim 12, wherein:

parallelizing the first serial data comprises:

sampling the first serial data by the first clock signal and deserializing the first serial data into a first packet of N-bits signal; and synchronizing the first packet of N-bits signal to a first divided clock signal, wherein the first divided clock signal is derived from the first clock signal by a first clock divider; and parallelizing the second serial data comprises:

sampling the second serial data by the second clock signal and deserializing the second serial data into a second N-bits signal; and synchronizing the second N-bits signal to a second divided clock signal, wherein the second divided clock signal is derived from the second clock signal by a second clock divider.

14. The method of serializing data of claim 13, wherein the second enable signal is derived from a second divided clock signal and a second divided clock late signal, wherein the second divided clock late signal comprises a time difference between a first divided clock signal and the second divided clock signal.

15. The method of serializing data of claim 13, wherein synchronizing the first parallel signal comprises synchronizing the first parallel signal by a first divided clock signal, and synchronizing the second latched signal comprises synchronizing the second latched signal by a first divided clock signal.

16. The method of serializing data of claim 13 wherein latching the first parallel signal is performed prior to synchronizing the first parallel signal.

17. The method of serializing data of claim 13, further comprising realigning the second divided clock signal to align with the first divided clock signal.

18. The method of serializing data of claim 13, further comprising:

detecting a phase delay between the first divided clock signal and the second divided clock signal; and generating the second latched signal based on the phase delay.

19. The method of serializing data of claim 12, wherein:

the first serial data comprises at least two data lanes of serial data and the second serial data comprises at least two data lanes of serial data;

parallelizing comprises parallelizing the first serial data and the second serial data;

latching comprises latching each data lane of the second parallel signal;

synchronizing comprises synchronizing each data lane of the first parallel signal and synchronizing each data lane of the second latched signal; and serializing comprises serializing each data lane of the first synchronized signal and each data lane of the second synchronized signal to produce the serial bitstream.

20. The method of serializing data of claim 12, further comprising serializing one or more additional signals, wherein the serial bitstream includes the first synchronized signal, the second synchronized signal, and the one or more additional signals.

* * * * *